UNITED STATES PATENT OFFICE.

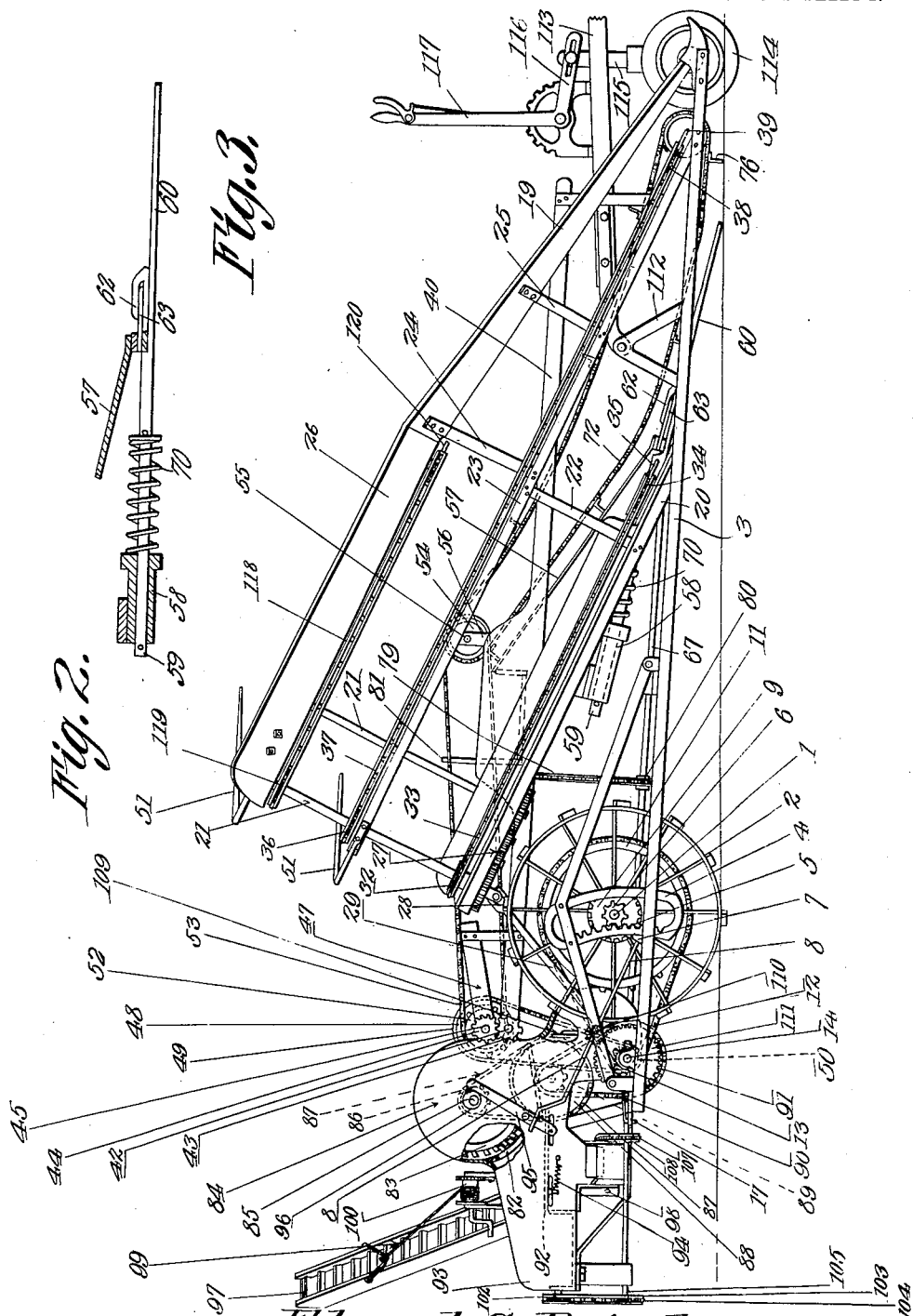

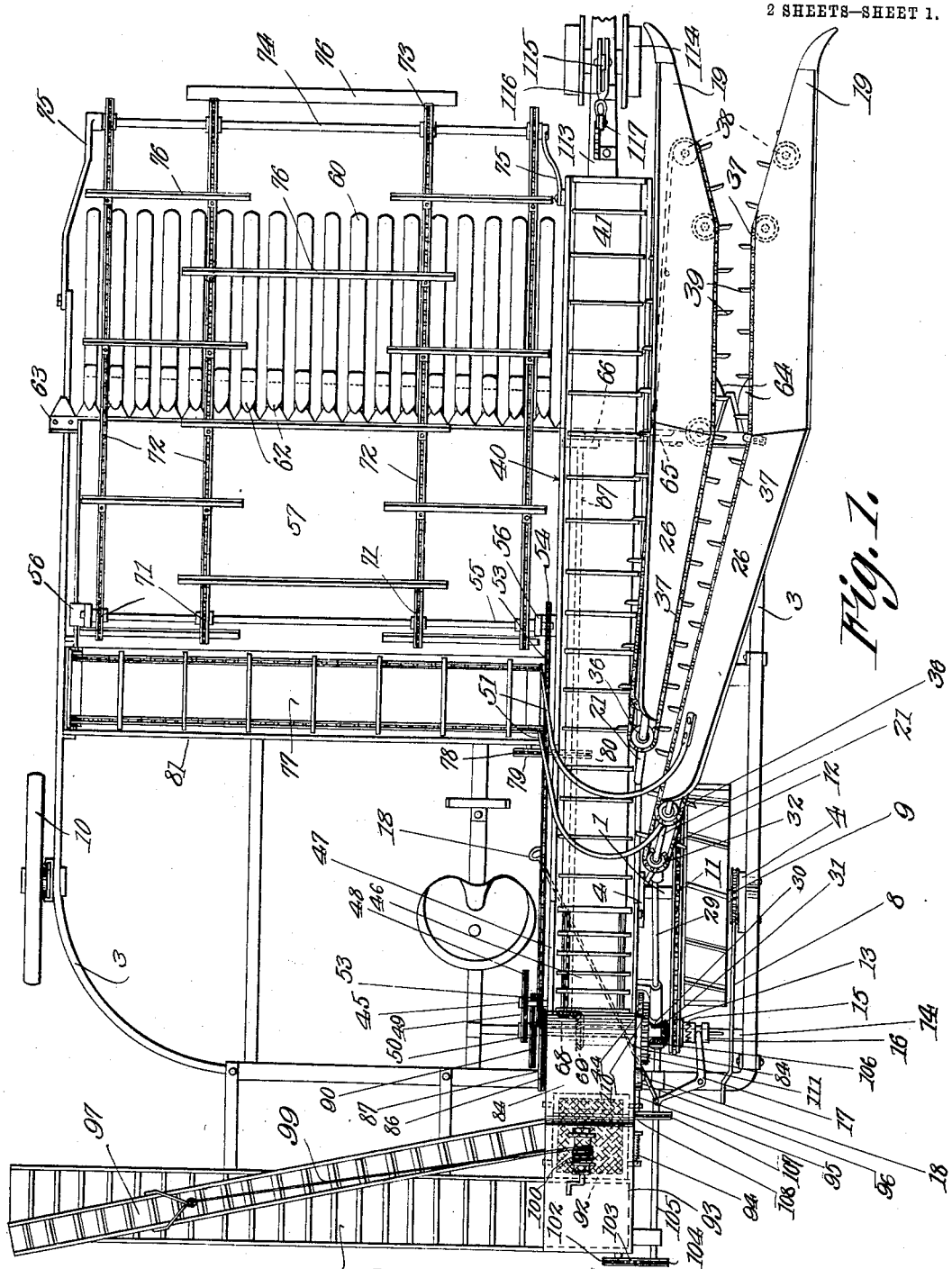

EDWARD C. REINDERS, OF ARAPAHOE, NEBRASKA.

CORN-HARVESTER.

1,095,520.

Specification of Letters Patent.

Patented May 5, 1914.

Application filed April 4, 1913. Serial No. 758,908.

*To all whom it may concern:*

Be it known that I, EDWARD C. REINDERS, a citizen of the United States, residing at Arapahoe, in the county of Furnas and State of Nebraska, have invented a new and useful Corn-Harvester, of which the following is a specification.

This invention relates to machines for harvesting corn, and one of its objects is to cut the standing corn and direct the stalks by suitable mechanism provided for that purpose, to a threshing mechanism where the grains of corn will be separated from the ears, the ears and stalks cut up, and the grains of corn separated from the balance of the products.

A further object is to provide means whereby loose ears of corn lying on the ground will be gathered by the machine and conveyed to the threshing mechanism.

A further object is to provide means whereby the front or gathering end of the machine can be adjusted vertically at the will of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine. Fig. 2 is a side elevation thereof.

Referring to the figures by characters of reference 1 designates the axle of the machine, the same being supported at one side by the drive wheel 2 and being provided with any suitable means for adjustably supporting the main frame 3 of the machine. For example, this main frame may be provided with slotted upstanding plates 4 formed with racks 5, these racks being engaged by gears 6 secured to the axle 1. Thus by rotating the axle the gears can be caused to shift the racks 5 longitudinally in either direction for the purpose of raising and lowering the frame 3. Any suitable means may be employed for rotating the axle, the preferred mechanism being made up of a worm 7 adapted to be rotated by a shaft 8, said worm meshing with a worm gear 9 secured to the axle. Another wheel 10 may be arranged at that side of the frame 3 remote from the wheel 2 and this additional wheel 10 can likewise be adjustably connected to the frame 3 in any preferred manner. Secured to the wheel 2 is a large drive sprocket 11 adapted to transmit motion through a chain 12 to a sprocket 13 loosely mounted on a transversely extending shaft 14 journaled in the frame 3. This sprocket 13 has a clutch member 15 revoluble therewith and another clutch member 16 is feathered on the shaft and is adapted to be actuated in any suitable manner, as by means of a bell crank lever 17 and a rod 18. By actuating this bell crank lever the clutch member 16 can be shifted into or out of engagement with the clutch member 15 so as thus to couple the sprocket 13 to or uncouple it from the shaft 14. Diverging forwardly from the front end portion of the frame 3 at one side thereof are dividers 19 and extending upwardly and rearwardly from the frame 3 at points back of the dividers are spaced strips 20 having posts 21 and 22 extending upwardly therefrom. These posts support additional spaced strips 23 which are inclined upwardly and rearwardly from the frame 3 and extend to points back of but close to the points of the dividers. Additional posts 24 and 25 are mounted on the strips 23 and support upwardly diverging boards 26 which are inclined upwardly and rearwardly from the points of the dividers and are spaced apart. The posts 21 are in the form of shafts extending from the upper end portions of the boards 26 downwardly through the upper end portions of the strips 23 and 20. Gears 27 constitute means for transmitting motion from one of the shafts 21 to the other, these gears being arranged in a train and the end gears of the train being attached to the shafts. One of the shafts 21 is connected, by a universal joint 28 to one end of an inclined shaft 29 extending downwardly and rearwardly and provided at its rear end with a bevel gear 30, this bevel gear meshing with a similar gear 31 secured to the shaft 14. Thus it will be seen that when the shaft 14 is rotated, motion will be transmitted therefrom through gears 31 and 30 to shaft 29 and thence through the universal joint 28 to one of the shafts 21, motion being transmitted from said shaft 21 to the other shaft 21 through the train of gears 27.

Secured to the lower end portions of the shafts 21 and close to the tops of the strips 20 are sprockets 32 engaged by endless chains 33 which extend along the tops of the strips 20 and into engagement with sprockets 34 located adjacent the lower ends of said strips 20. Each of these endless chains 33 has outstanding stalk engaging fingers 35. Secured to the shafts 21 close to the upper faces of the strips 23 are sprockets 36 on which are mounted endless chains 37, these chains extending along the upper faces of the strips 23 and downwardly to sprockets 38 located close to the lower and front ends of the strips 23. Chains 37 have outstanding stalk engaging fingers 39 similar to the fingers 35.

From the foregoing description it will be apparent that as the machine moves forward, motion will be transmitted to the several stalk engaging chains and these chains will operate to engage the stalks and gather them rearwardly within the machine. Extending longitudinally of the machine along one side of the stalk gathering means is a troughlike structure 40 in which is arranged an endless conveyer 41. This conveyer receives motion from a shaft 42 extending transversely of the rear end of the structure 40. A gear 43 is secured to shaft 42 and receives motion through a gear 44 from a transverse shaft 45 which drives another conveyer 46. This last named conveyer is arranged within a frame 47 and the said conveyer 46 is inclined downwardly and rearwardly toward the rear end portion of the conveyer 41 so that the two conveyers coöperate to form a throat to receive material and direct it rearwardly. A sprocket 48 is secured to shaft 45 and receives motion, through a chain 49, from a sprocket 50 secured to the shaft 14.

Upwardly and laterally curved deflecting fingers 51 are arranged at the upper or rear ends of the strips 23 and boards 26, these fingers overhang the conveyer 41 and serving to deflect stalks laterally onto the conveyer.

A sprocket 52 is secured to shaft 45, and motion is transmitted therefrom through a chain 53 to a sprocket 54 secured to a transverse shaft 55. This shaft is journaled within brackets 56 secured upon the side portions of an inclined table 57 extending laterally beyond one side of the conveyer 41, the lower front edge of the table being substantially in alinement with the front ends of the strips 20. Guides 58 are secured to the bottom of the table 57 and slidably mounted in these guides are stems 59 projecting rearwardly from flat gathering fingers 60 which project forwardly beyond the front edge of the table 57. The front ends of these fingers are adapted to contact yieldingly with the surface of the ground. Guide fingers 62 are arranged along the front or lower edge of table 57 and are slidably engaged by a cutter bar 63 of that type commonly used in harvesting machines whereby material gathered between the fingers 60 will be cut. This cutter bar extends throughout the width of the machine and also extends across the ends of the strips 20 where the blades of the cutter bar coöperate with the stationary knives 64 located in the space forming the stalk receiving passage. This knife is clearly illustrated in Fig. 1. A pitman 65 is connected to the cutter bar and to a disk 66 which rotates with a longitudinally extending shaft 67 journaled upon the frame 3, the rear end of said shaft 67 being provided with a bevel gear 68 meshing with a similar gear 69 secured to the shaft 14. Thus it will be seen that as the machine moves forward and shaft 14 rotates, motion will be transmitted therefrom through gears 69 and 68 to shaft 67 and the pitman 65 caused to reciprocate the cutter bar 63.

Springs 70 are mounted on the stems 59 of the fingers 60 and serve to hold the fingers normally projected forwardly and downwardly into contact with the ground. If, however, one of said fingers should come into contact with an unyielding obstruction, the said finger is free to slide backwardly against the action of its spring 70 and, as soon as the obstruction has been passed, the spring 70 will return the finger to its initial position.

Secured to the shaft 55 are sprockets 71 engaging endless chains 72 which extend forwardly to sprockets 73 supported by a shaft 74. This last named shaft is journaled in brackets 75 extending forwardly from the frame 3 so that the shaft 74 is thus held at a point in advance of the fingers 60. The chains 72 are connected by scrapers 76 disposed in staggered relation and covering a path extending throughout the width of the series of gathering fingers 60 and of the table 57. The chains 72 are slack so that the lower flights thereof will hang downwardly and permit the scrapers 76 to drag along the surface of the ground, thence along the inclined fingers 60, and finally along the inclined table 57. Arranged below the upper rear edge of the table 57 and extending throughout the width of said table is an endless conveyer 77 adapted to receive motion through a sprocket 78 and a chain 79 from a sprocket 80 secured to the shaft 67. A retaining board 81 extends upwardly close to and back of the conveyer 77 so that material discharged onto said conveyer by the scrapers 76 will not fall rearwardly off of the conveyer. Said conveyer is disposed slightly above the conveyer 41 and is adapted to discharge onto said conveyer 41. Arranged under and back of the discharge end of the conveyer 41 is a concave 82 and a cylinder 83 is concentrically mounted above the concave, said cylinder and concave being located within a housing 84. The cylinder is supported by a shaft 85 which receives motion, through a sprocket 86 and a chain 87 from a larger sprocket 88 which, in turn, rotates with a small sprocket 89 receiving motion, through a chain 90, from a sprocket 91 on shaft 14. Thus it will be seen that the speed of shaft 14 is greatly multiplied and the cylinder 83 can be caused to rotate at a high speed.

A screen 92 is supported within an outlet extension 93 of the casing 84 and is mounted for reciprocation, a spring 94 being provided for holding the screen normally in one position. A lever 95 may be pivotally connected to the screen and this lever can be actuated in any suitable manner, as by means of an eccentric 96 revoluble with shaft 85. Thus it will be seen that as the cylinder 83 rotates, the eccentric 96 will operate lever 95 and cause said lever to reciprocate the screen 92. Any material dropping through the screen will be directed onto the lower end of an upwardly and laterally inclined endless conveyer 97. This endless conveyer may be adjustably supported in any suitable manner, it being preferably hingedly mounted at its lower end, as shown at 98 and supported at its outer end by a cable 99 secured to a winding drum 100. The tailings from the screen are directed onto one end of another laterally extending endless conveyer 101. This last named conveyer receives motion through a sprocket 102 and a chain 103 from a sprocket 104 secured to a shaft 105. This shaft, in turn, receives motion through a bevel gear 106, from the bevel gear 31 on shaft 14. A sprocket 107 is secured to shaft 105 and transmits motion through a chain 108 to the conveyer 97. A fan 109 is arranged under the concave and is adapted to direct currents of air upwardly through the screen 92 so as to insure the proper separation of the lighter particles from the heavier ones. This fan may be driven in any preferred manner, as by means of a small gear 110 meshing with a larger gear 111 secured to shaft 14.

A bracket 112 is secured to the front portion of the frame 3 and a tongue 113 is hingedly connected to this bracket and extends forwardly therefrom. A caster 114 is arranged under the tongue and has a stem 115 adapted to slide upwardly and downwardly within said tongue. This stem is pivotally engaged by an arm 116 adapted to be swung upwardly and downwardly by a lever 117. Any suitable means may be provided for locking this lever against movement and it will be apparent that by adjusting the lever angularly stem 115 can be shifted upwardly or downwardly and the entire frame 3 and the parts supported thereby thus adjusted angularly relative to the tongue 113.

When it is desired to harvest corn the front end of the machine is first adjusted by manipulating lever 117 so as to bring the front ends of the fingers 60 slightly into contact with the ground. The machine is then drawn forward in any suitable manner so that one row of corn will enter between the dividers 19 so that the stalks will be engaged by the gathering fingers 39 and 35. During this forward movement the various parts of the machine will be operated in the manner hereinbefore described provided the clutch members 15 and 16 are in engagement with each other. Thus the cutter bar will be reciprocated and as the stalks are brought to position at opposite sides of the fixed blade 64, the knives of the cutter bar adjacent said blade will coöperate with the blade to sever the stalks. The stalks will be carried in substantially upright position upwardly between the chains 33 and 37 until they are brought against the deflecting fingers 51. These fingers will direct the severed stalks laterally so that they will fall onto the conveyer 41. The stalks will be carried rearwardly by the conveyer and into position under the overhanging conveyer 46. The two conveyers will thus grip the stalks and direct them into the concave 82 where they will be acted upon by the rapidly rotating cylinder 83. The material after thus being broken up will be directed onto the screen 92, and as this screen is constantly agitated by the oscillating lever 95, the finer heavier particles such as the grains of corn will drop through the screen and onto the elevator and conveyer 97 while the lighter and larger particles will be directed off of the tail of the screen and onto conveyer 101. During this movement of the machine along one row, the fingers 60 are traveling along two previously cut rows and as these fingers scrape along the ground they will, obviously, gather up any loose ears which may be lying on the ground. These ears will be engaged by the scrapers 76 and drawn upwardly along the fingers 60 and thence along table 57 and finally will be deposited onto the transverse conveyer 77. Said conveyer will direct the ears laterally onto conveyer 41 where they will be carried back to the concave with the other material directed onto conveyer 41 by the fingers 51. If desired, and as shown in Fig. 2, endless chains 118 may be arranged along the lower faces of the boards 26, these chains receiving motion through sprockets 119, from the shafts 21. Each of these chains may be provided with gathering fingers 120.

It is to be understood that the conveyer 101 is designed to receive the tailings and is to be so arranged as to operate intermittently, any desired mechanism being provided for this purpose, whereby the tailings will be discharged in spaced piles or windrows. The conveyer 97 is adapted to deliver material into a wagon or other suitable receptacle.

What is claimed is:—

1. The combination with a longitudinal conveyer, of stalk cutting and gathering means at one side thereof, means for directing the cut stalks onto the conveyer, separate downwardly and forwardly inclined longitudinally slidable means at the other side of the longitudinal conveyer for yieldingly engaging the surface of the ground for collecting loose ears, means extending across said collecting means for cutting material gathered therebetween, a transverse conveyer discharging onto the first named conveyer, and means for scraping ears along said collecting means and with said cut material onto the transverse conveyer.

2. In a corn harvester a table, downwardly and forwardly inclined separately movable gathering fingers extending forwardly therefrom and adapted to contact at their ends with the surface of the ground, yielding means for holding said fingers in contact with the ground, means adjacent the front edge of the table for cutting material entering between the fingers, and scraping means for directing loose ears along the fingers, and with the cut material, along the table.

3. In a corn harvester a table, downwardly and forwardly inclined separately movable gathering fingers extending beyond the front end of the table, yielding means for holding the front ends of the fingers in contact with the ground, means for cutting material entering between said fingers, said means being located adjacent the front edge of the table, endless chains having slack lower flights supported close to the fingers and table, scrapers carried by said chains for directing loose ears along the fingers and, with the cut material, along the table.

4. In a corn harvester a table, downwardly and forwardly inclined separately movable gathering fingers extending beyond the front end of the table, yielding means for holding the front ends of the fingers in contact with the ground, means adjacent the front end of the table for cutting material entering between the fingers, endless chains having slack lower flights supported close to the fingers and table, scrapers carried by said chains for directing loose ears along the fingers and, with the cut material, along the table, and a transverse conveyer back of the table for receiving ears from the scrapers and table.

5. In a corn harvester a table, downwardly and forwardly inclined separately movable gathering fingers extending beyond the front end of the table, yielding means for holding the front ends of the fingers in contact with the ground, means adjacent the front end of the table for cutting material entering between the fingers, endless chains having slack lower flights supported close to the fingers and table, scrapers carried by said chains for directing loose ears along the fingers and, with the cut material, along the table.

6. The combination with a conveyer, of stalk gathering means at one side thereof, means for directing the gathered stalks onto the conveyer, a table at the other side of the conveyer, downwardly and forwardly inclined spring pressed separately movable fingers yieldingly engaging the surface of the ground and projecting from the table, a cutter bar extending along the front end of the table and transversely of the gathering means, means coöperating with the cutter bar for severing stalks in the path thereof, and scraping means for directing loose ears along the fingers and table.

7. The combination with a conveyer, of stalk gathering means at one side thereof, means for directing the gathered stalks onto the conveyer, a table at the other side of the conveyer, downwardly and forwardly inclined spring pressed separately movable fingers yieldingly engaging the surface of the ground and projecting from the table, a cutter bar extending along the front end of the table and transversely of the gathering means, means coöperating with the cutter bar for severing stalks in the path thereof, scraping means for directing loose ears along the fingers and table, and a transverse conveyer for receiving the loose ears from the table and directing them onto the first named conveyer.

8. In a corn harvester, a table inclined upwardly and rearwardly, guide fingers projecting forwardly from the lower edge of the table, a cutter bar mounted for reciprocation on the fingers, downwardly and forwardly inclined gathering fingers slidably mounted under the guide fingers and extending therebeyond, yielding means for holding the gathering fingers normally projected into contact with the ground, said fingers being slidable rearwardly against the action of the springs and independently of each other, and scraping means shiftable longitudinally of the fingers and along the table, said scraping means being held by gravity in contact with the fingers and table.

9. In a corn harvester, a table inclined upwardly and rearwardly, guide fingers projecting forwardly from the lower edge of the table, a cutter bar mounted for reciprocation on the fingers, downwardly and forwardly inclined gathering fingers slidably mounted under the guide fingers and extending therebeyond, yielding means for holding the gathering fingers normally projected into contact with the ground, said fingers being slidable rearwardly against the action of the springs and independently of each other, and scraping means shiftable longitudinally of the fingers and along the table, said scraping means being held by gravity in contact with the fingers and table and being movable onto the fingers from points in advance thereof, thereby to engage the ground in advance of the fingers.

In testimony that I claim the foregoing as my own, I have hereto affixed my signature in the presence of two witnesses.

EDWARD C. REINDERS.

Witnesses:
 Roy R. Hart,
 J. E. Swanson.